United States Patent [19]
Fulton et al.

[11] Patent Number: 5,717,212
[45] Date of Patent: Feb. 10, 1998

[54] THREE DETECTOR HEAD GAMMA CAMERA SYSTEM WITH INDEPENDENTLY CIRCUMFERENTIALLY POSITIONABLE DETECTOR HEADS

[75] Inventors: James M. Fulton; Steven J. Plummer, both of Hudson, Ohio

[73] Assignee: Picker International, Inc., Highland Heights, Ohio

[21] Appl. No.: 635,390

[22] Filed: Apr. 25, 1996

[51] Int. Cl.⁶ .................................................. G01T 1/166
[52] U.S. Cl. ...................................... 250/363.05; 378/209
[58] Field of Search ....................... 378/209; 250/363.04, 250/363.05, 363.08; 5/601

[56] References Cited

U.S. PATENT DOCUMENTS

| | | | |
|---|---|---|---|
| 3,428,307 | 2/1969 | Hunter et al. | 378/209 |
| 4,204,123 | 5/1980 | Stoddart | 250/363 S |
| 5,039,859 | 8/1991 | Sanz et al. | 250/363.05 |
| 5,233,713 | 8/1993 | Murphy et al. | 378/209 |
| 5,367,169 | 11/1994 | Pierfitte | 250/363.05 |
| 5,444,252 | 8/1995 | Hug et al. | 250/363.08 |

FOREIGN PATENT DOCUMENTS

| | | | |
|---|---|---|---|
| 4-256885 | 9/1992 | Japan | 250/363.04 |

OTHER PUBLICATIONS

ADAC Advertising Brochure, ©1993 ADAC Laboratories (3 pp).
Sopha Medical Advertising Brochure ©1993 (2 pp).

*Primary Examiner*—Carolyn E. Fields
*Attorney, Agent, or Firm*—Fay, Sharpe, Beall, Fagan, Minnich & McKee

[57] ABSTRACT

A rotating gantry (20) is rotatably mounted to a stationary gantry for rotation around an axis of rotation. Gamma camera detector heads (22a, 22b, 22c) are mounted to the rotating gantry for rotation about a patient receiving region (14). A patient is supported on a first, cantilevered patient support portion (10) which is adjustable in height, and which selectively extends toward and away from a slab defined by the detector heads. In one mode of use, the first patient support portion (10) is supported on a second support surface (16) when fully cantilevered to minimize vibration and movement. In a second mode, the first patient support portion (10) is separated by a gap from the second support portion (16) and the region of interest of the patient is positioned over the gap. In this manner, radiation passing from the region of interest of the patient to the detector heads is not attenuated by a patient support structure. Further, the detector heads are mounted on tracks (30, 32) by rollers (44, 46). A linear motor (34) selectively moves each detector head along the tracks to change its circumferential position relative to the other detector heads. The movable detector head is further connected with pads (58) which slidably engage opposite faces of the tracks to prevent wobble and vibration.

13 Claims, 5 Drawing Sheets

THREE DETECTOR HEAD GAMMA CAMERA SYSTEM WITH INDEPENDENTLY CIRCUMFERENTIALLY POSITIONABLE DETECTOR HEADS

BACKGROUND OF THE INVENTION

The present invention relates to the nuclear medicine art. It finds particular application in conjunction with three head single photon emission computed tomography (SPECT) camera systems and will be described with particular reference thereto.

Early gamma or Anger cameras had a single radiation detector head which was positioned stationarily over a region of interest of the subject. The subject was injected with a radioactive dye which circulated through the patient's circulatory system. Some of the radiation given off by the dye was received by the gamma camera detector head which converted the radiation event into light.

More specifically, the detector head included a scintillation plate which converted each received radiation event into a scintillation or flash of light. An array of photomultiplier tubes positioned in back of the scintillator plate and associated circuitry determined an (x,y) coordinate location and an energy or (z) value for each scintillation event. A collimator including a grid-like array of lead vanes limited the path or trajectory of radiation events which could strike the scintillation plate. Typically, the collimator constrained each incremental element of the scintillator plate to be receptive only to radiation directly in front of it, i.e., radiation along paths substantially perpendicular to the scintillator plate. In this manner, a shadowgraphic image of the frequency of radiation events in the examined region of the subject was developed.

When the detector head was rotated around the subject or indexed to a multiplicity of angularly offset positions around the subject, a data set was collected which is the mathematical equivalent of a CT scanner data set. More accurately, because the nuclear camera head is two-dimensional, a series of data sets were collected which each corresponded to one slice of an imaged volume.

Instead of a single detector head, other gamma cameras have two detector heads positioned on opposite sides of the subject. Placing two detector heads on opposite sides of the subject improved the resolution and data collection efficiency. For other studies, it was advantageous to position the detector heads perpendicular to each other. This enabled a complete 180° data set to be collected by rotating the pair of detector heads only 90° relative to the subject. To improve the versatility of the two headed gamma camera, co-pending U.S. patent application Ser. No. 08/292,785 provided for a circumferential adjustment of the detector heads between 90° adjacent and opposite positions. This enables a single camera system to have the flexibility to conduct scans designed for a single head gamma camera, scans for a dual, parallel head gamma camera, and scans for a dual, orthogonal head gamma camera, all with a single gamma camera system.

Although single and dual detector gamma camera systems are flexible and cost-efficient, three detector head gamma cameras are commonly used for high resolution brain and cardiac SPECT studies. The triple head systems have higher sensitivity and better resolution than the one and two head systems. In three head gamma cameras, the heads are positioned at fixed 120° intervals around the subject. Typically, the heads are movable radially toward and away from the patient and the three heads are rotatable, as a unit, around the patient. Drawbacks to the triple head systems include their higher cost and lack of flexibility relative to one and two detector head systems. Typically, small clinics will have a one or two head gamma camera with triple head gamma cameras reserved for relatively large institutions that can provide a sufficiently large supply of patients needing the relatively specialized procedures of the triple head gamma camera to justify its expense.

The present application provides a new and improved triple head gamma camera which overcomes the above-referenced drawbacks and others.

SUMMARY OF THE INVENTION

In accordance with the present invention, a gamma camera system is provided which includes a stationary gantry, a rotating gantry which selectively rotates about an axis of rotation, three gamma camera detector heads supported at substantially equal angular increments by the rotating gantry and mounted for radial movement toward and away from the axis of rotation. A means is provided for moving at least one of the gamma camera heads circumferentially around the axis of rotation relative to the rotating gantry and at least another of the gamma camera heads.

In accordance with another aspect of the present invention, a gamma camera system is provided. A stationary gantry defines a patient receiving passage therethrough along and surrounding an axis of rotation. A rotatable gantry is rotatably mounted to the stationary gantry for rotation about the axis of rotation. A first detector head is supported on the rotatable gantry such that the detector head rotates around the axis of rotation as the rotatable gantry rotates. As it rotates, the detector head defines a viewed slab perpendicular to the axis of rotation. A patient support supports a patient generally parallel to the axis of rotation such that a region of interest of the patient lies within the slab. The patient support has a discontinuity within the slab. In this manner, when the detector head is disposed below the patient, radiation passes from the patient to the detector head without passing through a physical patient supporting structure.

In accordance with another aspect of the present invention, a method of using a gamma camera system which includes a stationary gantry on which a rotary gantry is rotatably mounted for rotation about an axis of rotation, a patient support for supporting a patient generally along the axis of rotation, and first, second, and third detector heads supported by the rotary gantry. The second detector head is moved circumferentially about the axis of rotation relative to the first detector head. The rotating gantry is moved around the axis of rotation.

One advantage of the present invention resides in its flexibility. The camera system is capable of performing most scan protocols that can be performed by one, two, and three-head gamma camera systems.

Another advantage of the present invention resides in its cost efficiency. A single triple head gamma camera of the present design could fulfill all the needs of a small diagnostic imaging department with a single camera system.

Another advantage of the present invention is that it facilitates high resolution imaging. The detector head is positionable very closely to the patient during SPECT studies, without patient repositioning.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
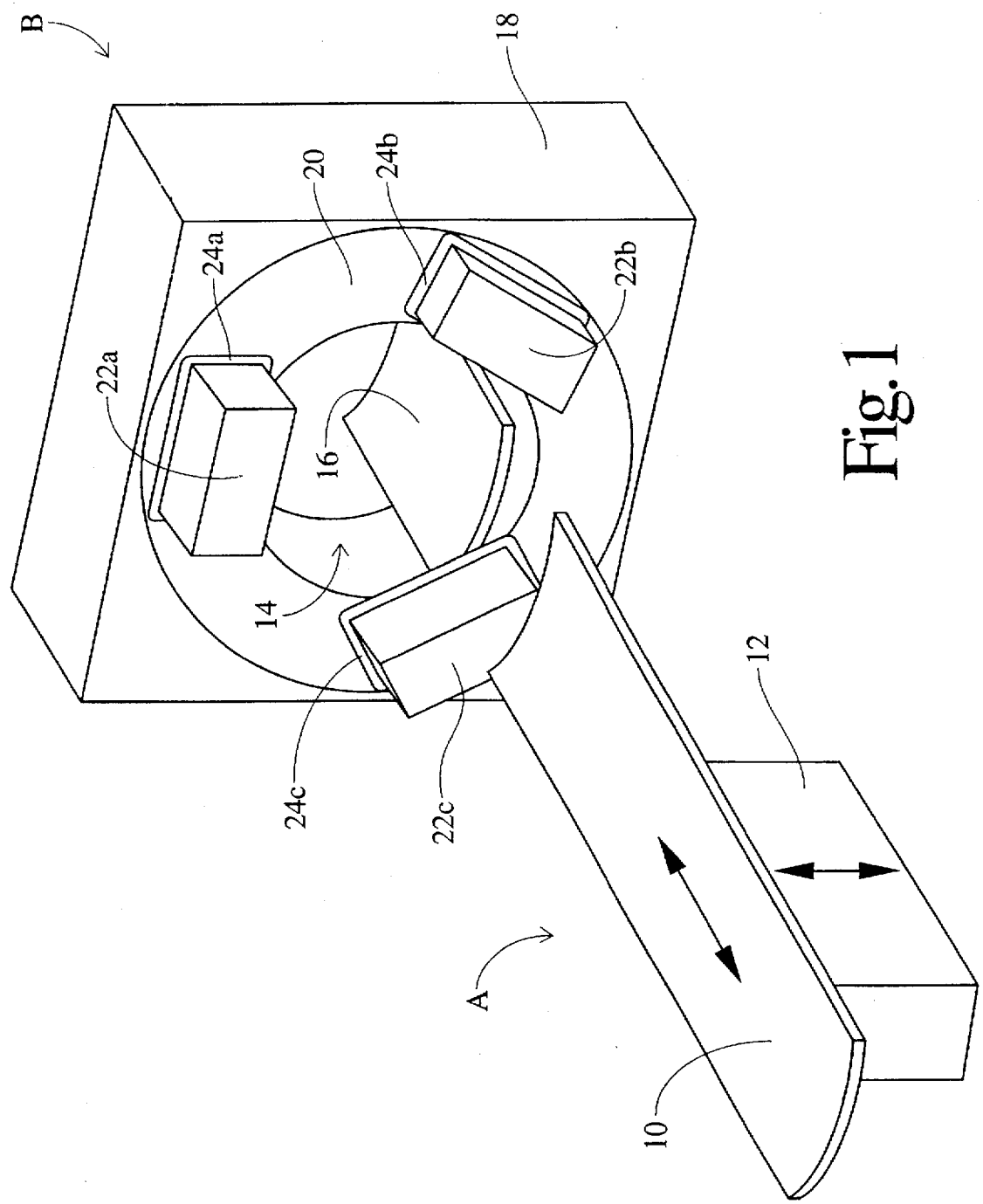
FIG. 1 is a perspective view illustrating a three head gamma camera in accordance with the present invention.

With reference to FIG. 1, a patient is supported on a patient support A. The patient support includes a thin, relatively radiation transmissive support surface 10 which is mounted cantilevered from a base 12. The base includes motors for raising and lowering the patient support surface and for extending and retracting the support surface relative to a nuclear camera gantry B. As the patient support surface extends into a bore 14 of the gantry, it becomes increasingly more cantilevered. A support surface 16 is disposed in the bore to receive one end of the cantilevered patient support surface 10 thereon to prevent its thin, cantilevered end from oscillating.

A stationary gantry 18 supports a rotatable gantry or annular ring 20 to which a plurality of nuclear camera heads 22a, 22b, 22c are mounted. The camera heads are each mounted on a support plate 24a, 24b, 24c, respectively. Each of the detector heads are mounted to the support plates in a rolling or sliding arrangement with a linear motor for moving each detector head radially toward and away from a center of the bore. In this manner, a distance between the detector heads and the bore is selectively minimizable. During a typical scan, a motor within the stationary gantry rotates the rotatable gantry 20, causing all three detector heads to rotate about the subject. During rotation, each detector head selectively moves radially closer and further from the patient such that the detector heads follow trajectories which minimize distance between the patient or patient support and each detector head.

Although the patient support surface 10 is relatively transparent to radiation, it still attenuates some of the radiation which passes through it, degrading the quality of images reconstructed from data collected through the patient support. To optimize resolution during heart scans, the patient is positioned partially on the patient support surface 10 and partially on the support surface 16. The patient support surface 10 and the support surface 16 are spaced by the smaller of the width of the detector heads and the region of interest. This enables the detector heads to receive radiation in all directions directly from the patient without attenuation through the patient support and without changing trajectories of the detector heads to accommodate edges of the patient support. The split table arrangement is also advantageous for breast exams. The patient is positioned face down on the table, such that the breasts extend downward between the patient support 10 and the support 16. This again enables the detector heads to receive radiation unattenuated by patient support surface.

Figure 2:
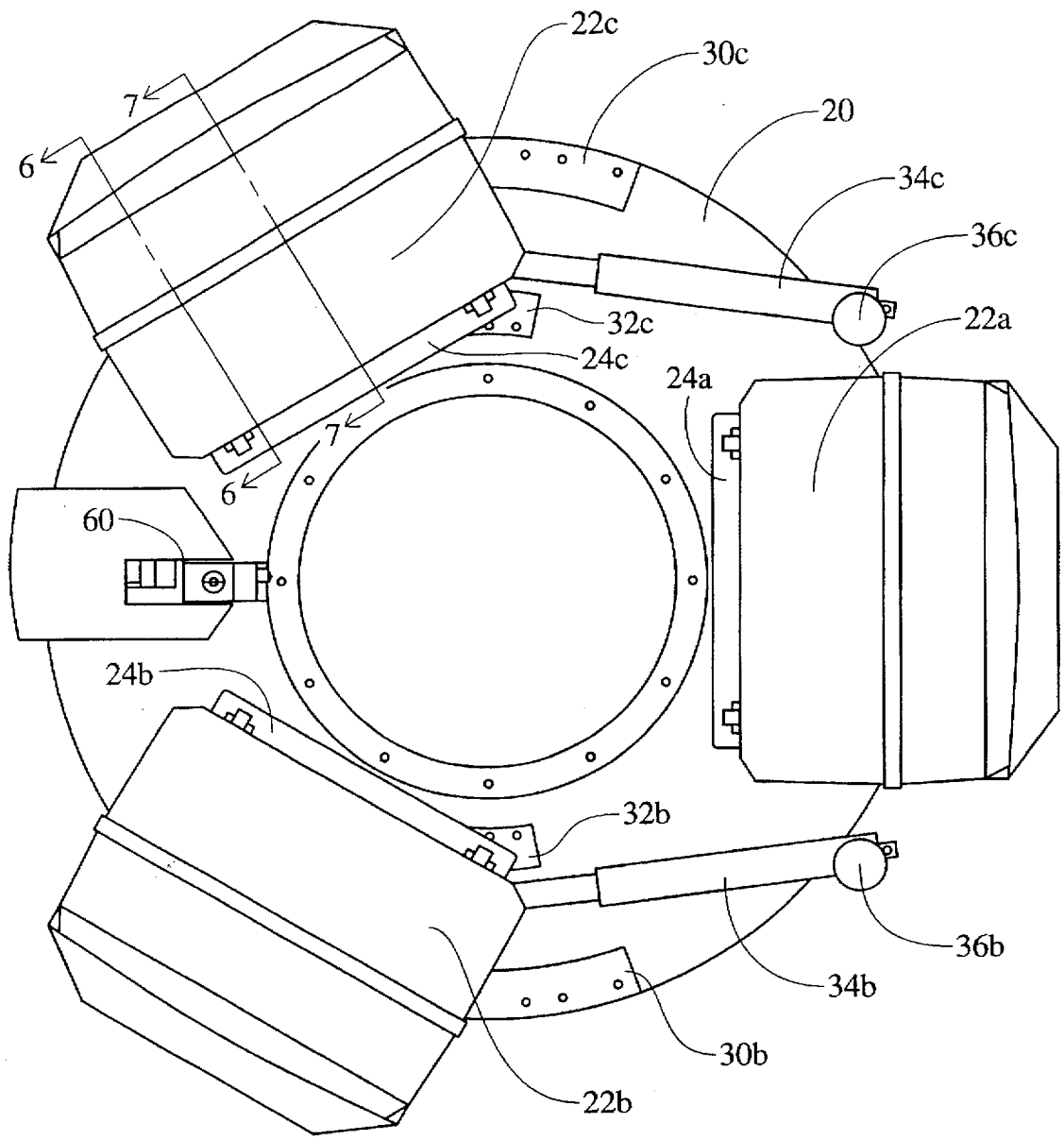
FIG. 2 is a diagrammatic illustration of the three head camera of FIG. 1 with the detector heads disposed at 120° intervals.

With reference to FIG. 2, a pair of arcuate tracks 30b and 32b are mounted to the rotatable gantry 20 adjacent the second detector head 22b and another pair of arcuate tracks 30c and 32c are disposed along the rotatable gantry 20 adjacent the third detector head 22c. The support plates 24b and 24c are slidably mounted on the arcuate tracks. A pair of linear motors or actuators 34b and 34c are connected with the support plates 24b and 24c, respectively. In the preferred embodiment, the linear motors or actuators each include a motor 36b, 36c which is connected through a gear arrangement with an elongated screw that is rotatably received in a follower supported by the support plate 24b, 24c.

Figure 3:
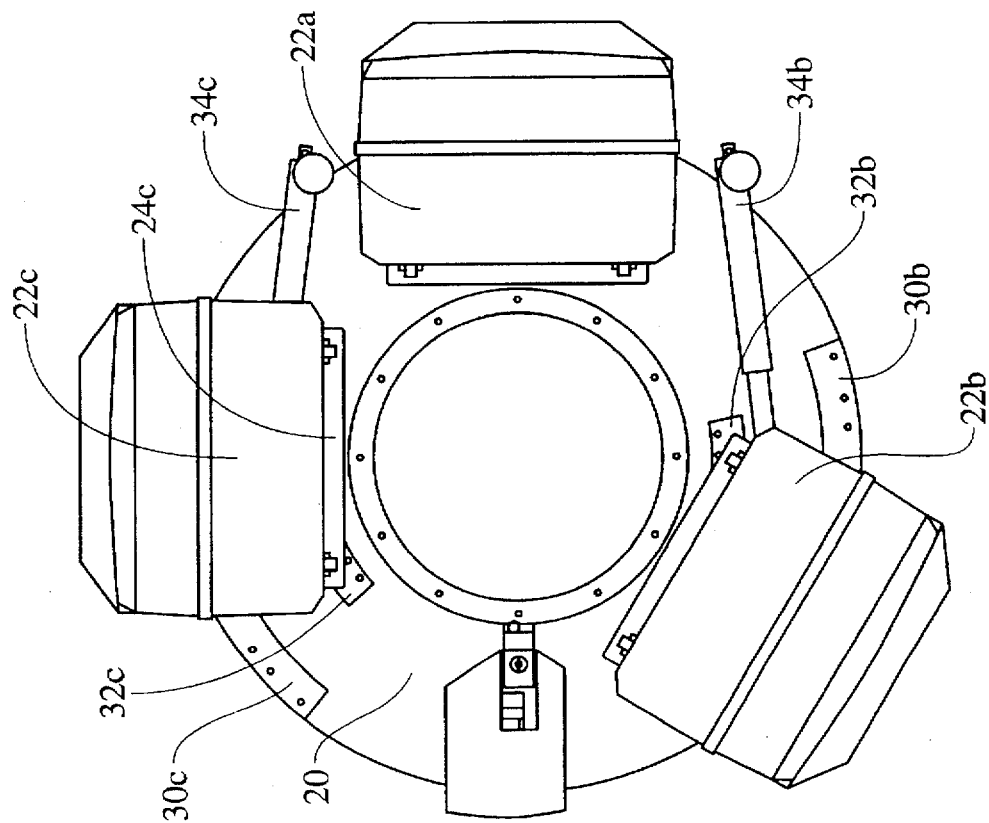
FIG. 3 is a diagrammatic illustration of the three head gamma camera of FIG. 2 with two of the heads positioned orthogonal to each other.

With reference to FIG. 3, the arcuate tracks are of sufficient length that either of the movable detector heads is movable to a position orthogonal to one of the other detector heads, e.g., head 22a. The detector heads are again movable radially closer to and further from the patient. In the embodiment of FIG. 3, the detector head 22b is positioned generally opposite to the two detector heads 22a, 22c. This enables the two orthogonal detector heads to be used like a dual head gamma camera in which the detector heads are mounted orthogonal to each other. The opposite head may be used to supply additional data or may be shut off.

Figure 4:
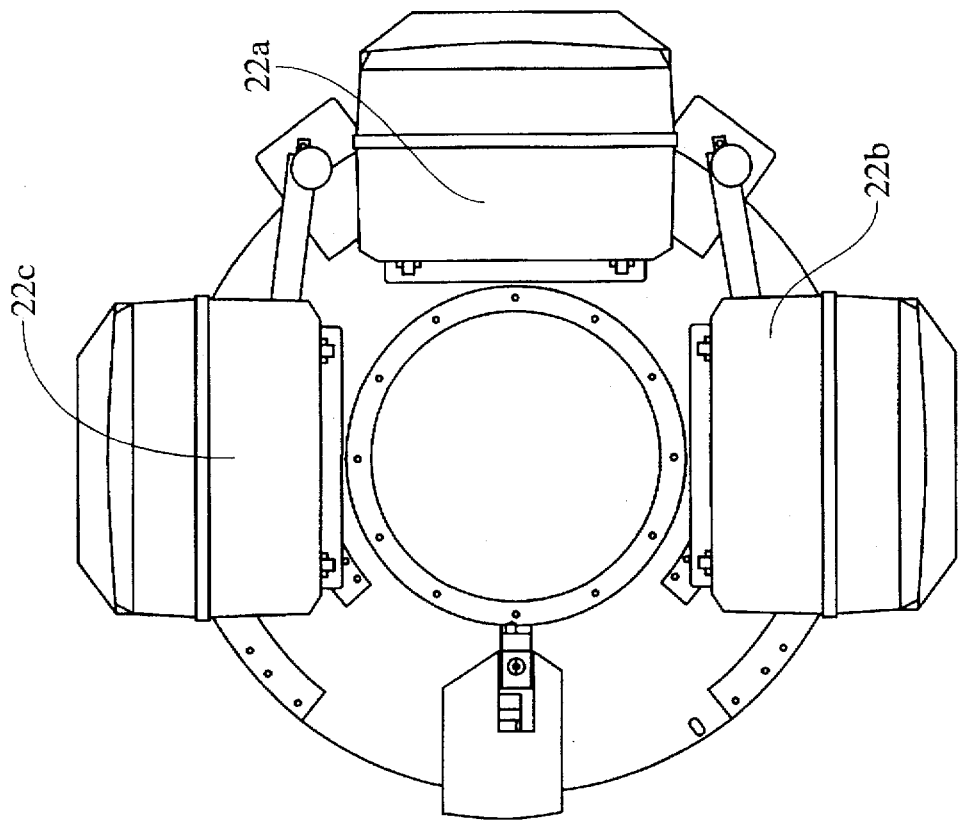
FIG. 4 is a diagrammatic illustration of the three head gamma camera system of FIG. 2 with two of the heads positioned diametrically opposite to each other.

With reference to FIG. 4, the tracks are also dimensioned such that two of the detector heads 22b, 22c are disposable 180° opposite to each other. These two detector heads can now be used to perform procedures commonly performed by a dual head gamma camera with oppositely mounted heads. The third head 22a may again provide additional diagnostic data or may be moved to its furthest back radial position and shut off.

Figure 5:
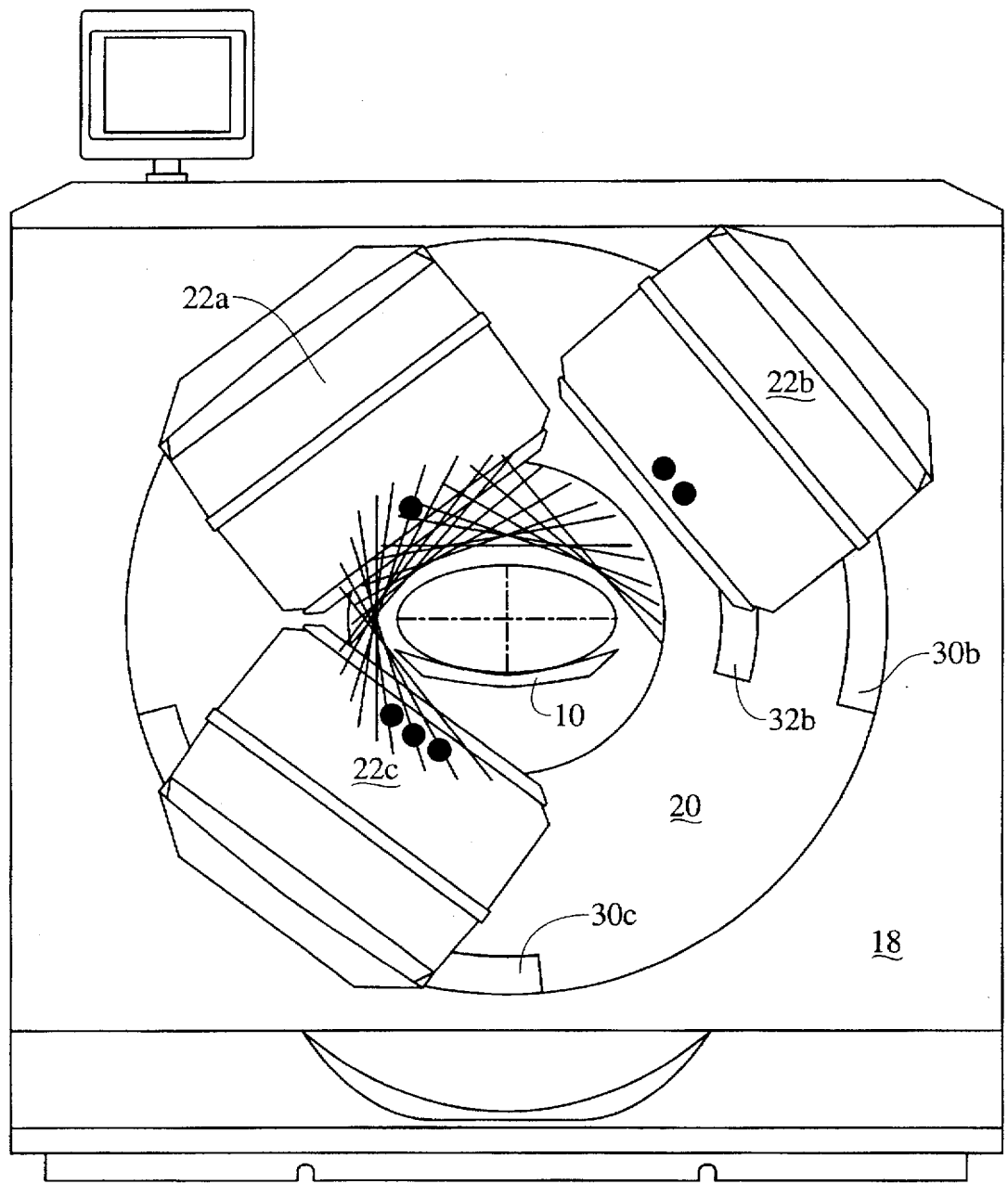
FIG. 5 is a diagrammatic illustration of the three head gamma camera of FIG. 2 with two of the heads disposed at an acute angle relative to each other.

With reference to FIG. 5, two of the detector heads 22a, 22c are also positionable such that their faces are at acute angles to each other and the rays which are perpendicular to the center of each face are at obtuse angles to each other, e.g., a center ray angle of 102°. Because the patient is oval rather than circular in cross-section, the spacing between the detector head and the patient can be minimized at the narrow ends of the oval when the center rays are at an obtuse angle. Similarly, positioning the center rays of adjacent heads at an acute angle adjacent the flatter side of the patient can minimize spacing at that position, e.g., an 80° angle.

Figure 7:
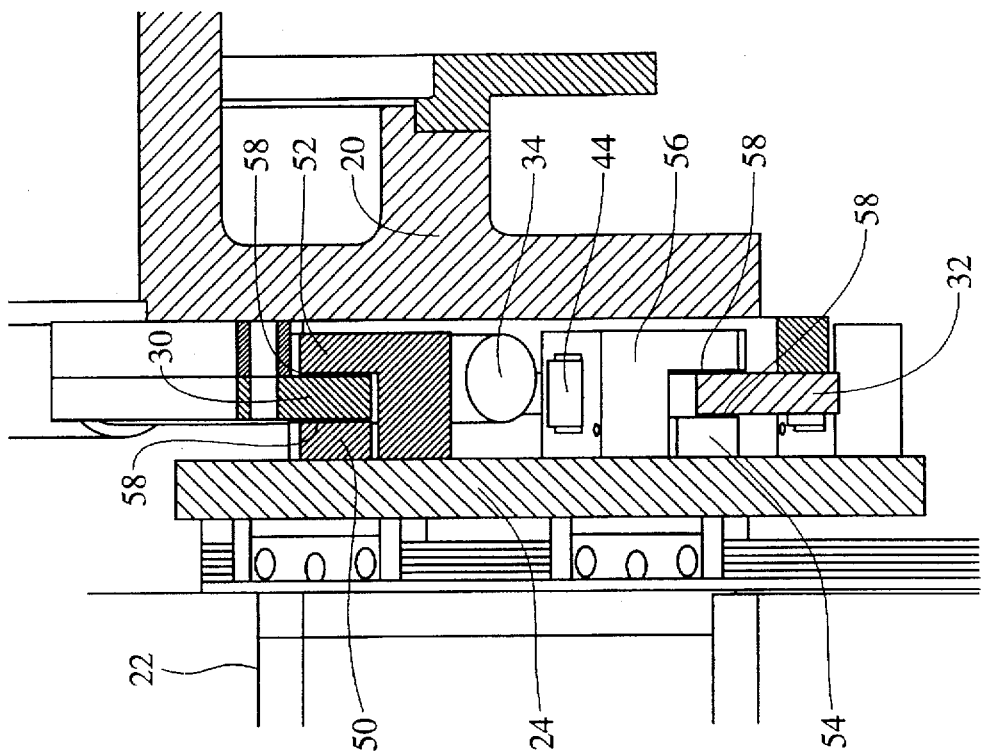
Figure 6:
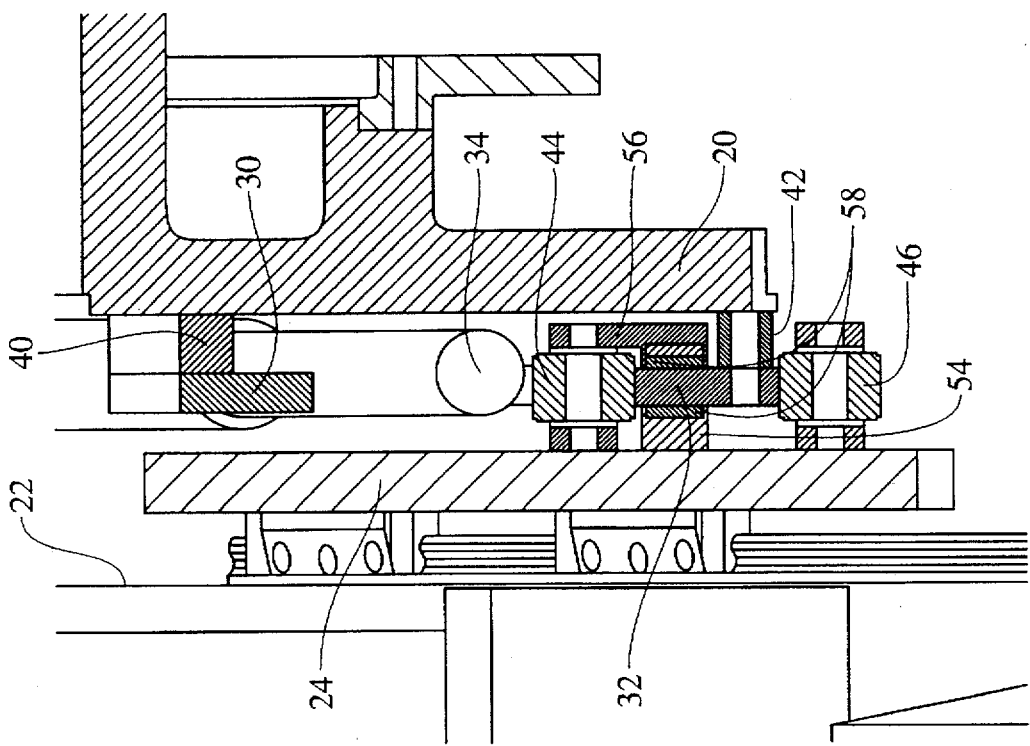
FIG. 6 is a sectional drawing orthogonally through the arcuate tracks of FIG. 2 to illustrate details of the mounting arrangement for mounting one of the gamma camera detector heads to the rotatable gantry; and, FIG. 7 is a sectional view transversely through the arcuate guide rails and associated rotatable gantry and detector head support plates to illustrate further details of the mounting arrangement.

With reference to FIGS. 6 and 7, the arcuate tracks 30, 32 are mounted to spacers 40, 42 which hold the tracks a fixed distance offset from the face of the rotatable gantry 20. The support plate 24 has a pair of rollers 44, 46 mounted offset therefrom to engage opposite edges of the track 32. By positioning a pair of rollers at each end of the support plate 24, the support plate is mounted in easy rolling engagement with the arcuate tracks. To prevent the detector heads from wobbling, each detector support plate 24 is connected with an arrangement 50 which engages the front face of the track 30 and an L-shaped arrangement 52 which engages the rear face of track 50. Analogously, an arrangement 54 engages a first face of the arcuate track 32 and an analogous L-shaped arrangement 56 engages the rear face of track 32. Each of the arrangements 50, 52, 54, 56 carries a friction minimizing element 58. In the preferred embodiment, the wear resisting element includes low friction, high wear polymeric pads 58. Preferably, an adjustment mechanism is provided for adjusting the pads such that they press sufficiently firmly against the track that wobble is minimized, yet not so tight that high frictional drag is created.

Preferably, potentiometers or position encoders are provided along the arcuate tracks and the corresponding guide portions to measure the precise angular position of each detector head. With precise circumferential position information, the detector heads can be circumferentially repositioned during rotation of the rotating gantry 20. Optionally, as illustrated in FIGS. 2–4, a transmission radiation source 60 is disposed opposite to one of the detector heads, preferably the stationary detector head 22a. The transmission radiation source has a shutter which is opened to emit a beam of radiation of a first energy level which passes through the patient and is received by the first detector head 22a. The patient is injected with a radiographic pharmaceutical of a second energy, or possibly second or third energies, which are received by all of the detector heads. The first detector head distinguishes between the transmission and emission radiation on the basis of energy.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A gamma camera system comprising:
   a stationary gantry;
   a rotatable gantry which selectively rotates around an axis of rotation;
   three gamma camera heads supported at substantially equal angular increments by the rotatable gantry;
   a means for moving each gamma camera head radially toward and away from the axis of rotation;
   a means for moving at least one of the gamma camera heads circumferentially around the axis of rotation relative to the rotatable gantry and at least another of the gamma camera heads, the circumferential movement being independent from the radial move such that the at least one camera head is moveable with a circumferential component of motion only, with a radial component of motion only, and with both radial and circumferential components of motion concurrently.

2. In the gamma camera as set forth in claim 1, the improvement further comprising:
   a means for moving a second of the gamma camera heads circumferentially relative to the rotatable gantry and the other two gamma camera heads.

3. In the gamma camera system as set forth in claim 1, the improvement further comprising:
   a first subject support surface disposed generally parallel to and adjacent the axis of rotation to one side of the gamma camera heads and a second support surface disposed generally parallel to and adjacent the axis of rotation toward an opposite side of the gamma camera heads, the first and second support surfaces being discontinuous such that there is a gap within a plane defined through the gamma camera heads, orthogonal to the axis of rotation in which a subject is unsupported, whereby radiation detected below the subject is detected directly without being attenuated by a subject support structure.

4. In a gamma camera system which includes a stationary gantry, a rotatable gantry which selectively rotates around an axis of rotation, three gamma camera heads supported at substantially equal angular increments by the rotatable gantry and mounted for radial movement toward and away from the axis of rotation, the improvement comprising:
   a circumferential movement means for moving at least one of the gamma camera heads circumferentially around the axis of rotation relative to the rotatable gantry and at least another of the gamma camera heads;
   the circumferential movement means including:
      at least one relatively flat track extending circumferentially around the axis of rotation and mounted to the rotating gantry, the track having a rearward facing surface facing toward the rotatable gantry and a forward facing surface;
      first and second pads which slidingly engage the rearward facing and forward facing surfaces of the track, the pads being connected with the at least one gamma camera head such that the at least one gamma camera head is slidably movable along the track;
      a motor for slidingly moving the at least one gamma camera head along the track.

5. In the gamma camera as set forth in claim 4, the improvement further comprising:
   at least one pair of rollers for engaging opposite edges of the track for rolling movement thereamong, the rollers being connected with the at least one gamma camera head such that the at least one gamma camera head is mounted for rolling movement along the track.

6. A gamma camera comprising:
   a stationary gantry;
   a rotatable gantry which selectively rotates around an axis of rotation;
   three gamma camera heads supported at substantially equal angular increments by the rotatable gantry and mounted for radial movement toward and away from the axis of rotation;
   a means for moving at least one of the gamma camera heads circumferentially around the axis of rotation relative to the rotatable gantry and at least another of the gamma camera heads, the circumferential movement means including:
      at least one relatively flat track extending circumferentially around the axis of rotation and mounted to the rotating gantry;
      at least one pair of rollers for engaging opposite edges of the track for rolling movement thereamong, the rollers being connected with the at least one gamma camera head such that the at least one gamma camera head is mounted for rolling movement along the track; and
      a motor for rollingly moving the at least one gamma camera head along the track.

7. A gamma camera system comprising:
   a stationary gantry defining a patient receiving passage therethrough along and surrounding an axis of rotation;

a rotatable gantry rotatably mounted to the stationary gantry for rotation about the axis of rotation;

a first detector head supported on the rotatable gantry such that the detector head rotates around the axis of rotation as the rotatable gantry rotates, the detector head defining a slab perpendicular to the axis of rotation as the rotatable gantry rotates;

a patient support for supporting a patient generally parallel to the axis of rotation such that a region of interest of the patient lies within the slab, the patient support having a complete discontinuity within the slab such that when the detector head is disposed in any circumferential position around the patient, radiation passes from the patient to the detector head without passing through a physical patient supporting structure, the patient support further including:

a first support surface mounted at one side the stationary gantry and extending generally parallel to the axis of rotation on one side of the slab; and, a second support surface disconnected from the first support surface which extends generally parallel to the axis of rotation on an opposite side of the slab from the first support portion.

8. The gamma camera system as set forth in claim 7 further including:

a second detector head mounted to the rotatable gantry;

a third detector head mounted to the rotatable gantry;

a motor for moving at least one of the first, second, and third detector heads circumferentially along the rotatable gantry relative to the other detector heads.

9. A gamma camera system comprising:

a stationary gantry defining a patient receiving passage therethrough along and surrounding an axis of rotation;

a rotatable gantry rotatably mounted to the stationary gantry for rotation about the axis of rotation;

a first detector head supported on the rotatable gantry such that the detector head rotates around the axis of rotation as the rotatable gantry rotates, the detector head defining a slab perpendicular to the axis of rotation as the rotatable gantry rotates;

a patient support for supporting a patient generally parallel to the axis of rotation such that a region of interest of the patient lies within the slab, the patient support having a discontinuity within the slab such that when the detector head is disposed below the patient, radiation passes from the patient to the detector head without passing through a physical patient supporting structure;

a first pair of guide rails mounted to the rotatable gantry and extending generally along a circumferential arc segment;

a second set of guide rails mounted to the rotatable gantry and extending along a second generally circumferential arc segment;

a first detector head support slidably mounted for movement along the first pair of guide rails;

the first detector head being mounted to the first detector head support member;

a second detector head support member slidably mounted for movement along the second pair of guide rails;

a second detector head mounted to the second detector head support member;

a source of motive power for moving the first and second detector heads support members along the first and second pairs of guide rails.

10. A method of using a gamma camera system which includes a stationary gantry on which a rotary gantry is rotatably mounted for rotation about an axis of rotation, first, second, and third detector heads supported on the rotary gantry, and a patient support for supporting a patient generally along the axis of rotation, the method comprising:

moving the second detector head with a radial motion only;

moving the second detector head with a circumferential motion only about the axis of rotation relative to the first detector head; and moving the rotary gantry around the axis of rotation.

11. The method as set forth in claim 10 further including:

moving the third detector head circumferentially around the axis of rotation relative to the first and second detector heads and the rotatable gantry.

12. A method of using a gamma camera system which includes a stationary gantry on which a rotatable gantry is rotatably mounted for rotation about an axis of rotation, detector heads supported on the rotatable gantry, a patient support for supporting a patient generally along the axis of rotation, the patient support including first and second supporting portions with a discontinuity therebetween, the method comprising:

positioning the patient with portions of the patient on either side of the region of interest supported on the first and second patient portions, respectively, with the region of interest unsupported;

rotating the rotatable gantry around the axis of rotation such that the detector heads receive radiation directly from the patient without passing through the patient support at all circumferential positions around the patient.

13. A method of using a gamma camera system which includes a stationary gantry on which a rotatable gantry is rotatably mounted for rotation about an axis of rotation, first, second, and third detector heads supported on the rotatable gantry, a patient support for supporting a patient generally along the axis of rotation, guide rails extending along an arc segment along the rotatable gantry, the method comprising:

moving the second detector head circumferentially about the axis of rotation relative to the first detector head along the guide rails;

moving the rotatable gantry around the axis of rotation.

* * * * *